US010615912B2

(12) United States Patent
Tong et al.

(10) Patent No.: US 10,615,912 B2
(45) Date of Patent: Apr. 7, 2020

(54) APPARATUSES, COMPUTER-READABLE MEDIA, AND METHODS FOR SINGLE DIMENSION MAXIMAL LIKELIHOOD SYMBOL DETECTION

(71) Applicant: Samsung Electronics Co., Ltd., Suwon-si, Gyeonggi-do (KR)

(72) Inventors: Fei Tong, Bassingbourn (GB); Paul Nicholas Fletcher, Cambridge (GB)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/108,259

(22) Filed: Aug. 22, 2018

(65) Prior Publication Data
US 2020/0067635 A1   Feb. 27, 2020

(51) Int. Cl.
*H04L 1/00* (2006.01)
*H04B 7/0413* (2017.01)
*H04B 7/08* (2006.01)
*H04L 25/03* (2006.01)
*H04L 25/02* (2006.01)

(52) U.S. Cl.
CPC ......... *H04L 1/0054* (2013.01); *H04B 7/0413* (2013.01); *H04B 7/0857* (2013.01); *H04L 25/0256* (2013.01); *H04L 25/03318* (2013.01); *H04L 25/03891* (2013.01)

(58) Field of Classification Search
CPC ............... H04L 1/0054; H04L 25/0256; H04L 25/03318; H04L 25/03891; H04B 7/0413; H04B 7/0857; H03M 13/41; H03M 13/4107; H03M 13/6502; G11B 20/10009
See application file for complete search history.

(56) References Cited

U.S. PATENT DOCUMENTS

| 2013/0287150 A1* | 10/2013 | Jung ..................... H04L 5/0023 375/341 |
| 2015/0188667 A1* | 7/2015 | Tong .................... H04L 1/0048 375/341 |
| 2016/0142182 A1* | 5/2016 | Scherb .................. H04L 1/0059 375/341 |

* cited by examiner

*Primary Examiner* — Ted M Wang
(74) *Attorney, Agent, or Firm* — Harness, Dickey & Pierce, P.L.C.

(57) ABSTRACT

A wireless communication device configured to select a spatial stream among a plurality of spatial streams, the plurality of spatial streams being included in a received signal vector, the received signal vector being associated with a symbol constellation, calculate a plurality of distance values, each distance value representing a distance between the selected spatial stream and a different hypothesis symbol among a plurality of hypothesis symbols, the plurality of hypothesis symbols corresponding to the symbol constellation, repeat the selection and the calculation for all spatial streams among the plurality of spatial streams not previously selected, and determine a detected symbol of each spatial stream among the plurality of spatial streams based on the plurality of distance values calculated for the plurality of spatial streams.

20 Claims, 7 Drawing Sheets

APPARATUSES, COMPUTER-READABLE MEDIA, AND METHODS FOR SINGLE DIMENSION MAXIMAL LIKELIHOOD SYMBOL DETECTION

BACKGROUND

Some example embodiments relate to detecting symbols encoded in a Multiple-Input Multiple-Output (MIMO) spatial multiplexing transmission.

Multiple-Input Multiple-Output (MIMO) spatial multiplexing increases spectrum efficiency according to the number of antennas for communication. Before decoding symbols encoded in a received MIMO spatial multiplexing transmission, a MIMO receiver detects the symbols in the transmission. For example, maximal likelihood solutions are used to detect the symbols encoded in MIMO spatial multiplexing transmissions.

Finding a maximal likelihood solution involves searching a lattice of points in a multi-dimensional space. The points in the lattice correspond to each possible symbol vector made up of every possible combination of symbols for a given encoding scheme (also referred to herein as a "constellation"). Accordingly, the number of points in the lattice is dependent upon the number of symbols in the symbol vector (also referred to herein as the number of "spatial streams") and the number of possible symbols in the encoding scheme. Hence, the complexity of finding the maximal likelihood solution is in the order of $O(M^L)$, where M is the size of the constellation and L is the number of spatial streams, assuming equal modulation order over all spatial streams.

SUMMARY

According to some example embodiments, apparatuses, computer-readable media and methods are provided for converting a multidimensional search space into a plurality of single dimension search spaces for maximal likelihood symbol detection with reduced complexity.

According to some example embodiments, a wireless communication device is provided. The wireless communication device may include a memory storing computer-readable instructions, and at least one processor coupled to the memory and configured to execute the computer-readable instructions to select a spatial stream among a plurality of spatial streams, the plurality of spatial streams being included in a received signal vector, the received signal vector being associated with a symbol constellation. The at least one processor is further configured to execute the computer-readable instructions to calculate a plurality of distance values, each distance value representing a distance between the selected spatial stream and a different hypothesis symbol among a plurality of hypothesis symbols, the plurality of hypothesis symbols corresponding to the symbol constellation. The at least one processor is further configured to execute the computer-readable instructions to repeat the selection and the calculation for all spatial streams among the plurality of spatial streams not previously selected. The at least one processor is further configured to execute the computer-readable instructions to determine a detected symbol of each spatial stream among the plurality of spatial streams based on the plurality of distance values calculated for the plurality of spatial streams.

According to some example embodiments, a non-transitory computer-readable medium is provided. The non-transitory computer-readable medium may store instructions that, when executed by at least one processor, cause the processor to select a spatial stream among a plurality of spatial streams, the plurality of spatial streams being included in a received signal vector, the received signal vector being associated with a symbol constellation. The instructions, when executed by the at least one processor, further cause the processor to calculate a plurality of distance values, each distance value representing a distance between the selected spatial stream and a different hypothesis symbol among a plurality of hypothesis symbols, the plurality of hypothesis symbols corresponding to the symbol constellation. The instructions, when executed by the at least one processor, further cause the processor to repeat the selection and the calculation for all spatial streams among the plurality of spatial streams not previously selected. The instructions, when executed by the at least one processor, further cause the processor to determine a detected symbol of each spatial stream among the plurality of spatial streams based on the plurality of distance values calculated for the plurality of spatial streams.

According to some example embodiments, a method performed by a wireless communication device is provided. The method includes selecting a spatial stream among a plurality of spatial streams, the plurality of spatial streams being included in a received signal vector, the received signal vector being associated with a symbol constellation. The method further includes calculating a plurality of distance values, each distance value representing a distance between the selected spatial stream and a different hypothesis symbol among a plurality of hypothesis symbols, the plurality of hypothesis symbols corresponding to the symbol constellation. The method further includes repeating the selecting and the calculating for all spatial streams among the plurality of spatial streams not previously selected. Furthermore, the method includes determining a detected symbol of each spatial stream among the plurality of spatial streams based on the plurality of distance values calculated for the plurality of spatial streams.

BRIEF DESCRIPTION OF THE DRAWINGS

Some example embodiments will be more clearly understood from the following detailed description taken in conjunction with the accompanying drawings in which.

DETAILED DESCRIPTION

Figure 1:
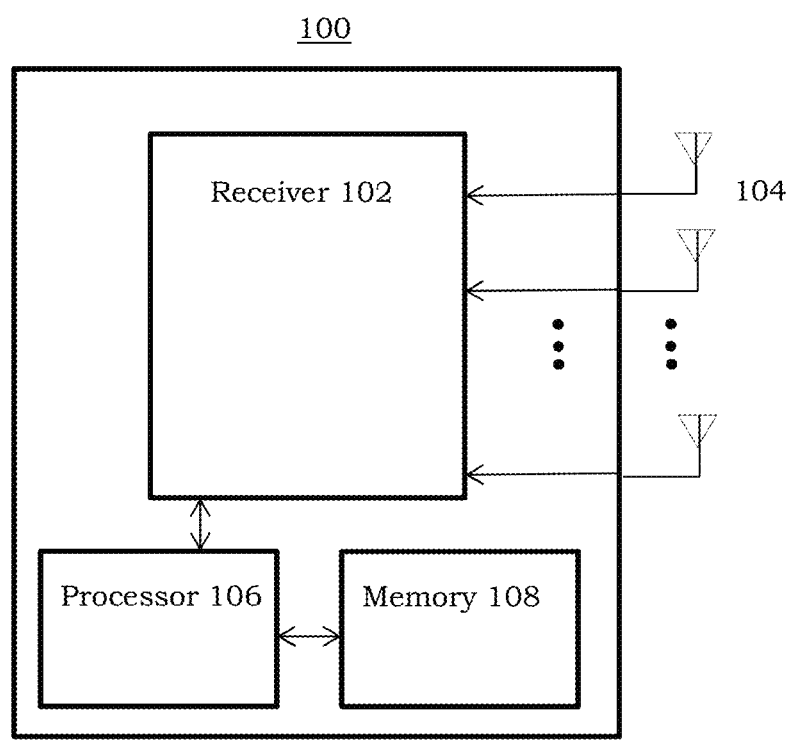
FIG. 1 is a block diagram of wireless communication device 100, according to some example embodiments.

FIG. 1 is a block diagram of a wireless communication device 100, according to some example embodiments. The wireless communication device 100 may communicate with other wireless communication equipment using Multiple-Input Multiple-Output (MIMO) spatial multiplexing.

As a non-limiting example, a wireless communication system in which the wireless communication device 100 communicates with other wireless communication equipment may be a 5th generation wireless (5G) system, a Long Term Evolution (LTE) system, an LTE-Advanced system, a Code Division Multiple Access (CDMA) system, a Global System for Mobile Communications (GSM) system, a Wireless Local Area Network (WLAN) system, or another arbitrary wireless communication system.

A wireless communication network of the wireless communication system may support communication between users by allowing available network resources to be shared. For example, via a wireless communication network, information may be transmitted in various multiple access manners such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), Orthogonal Frequency Division Multiplex (OFDM) FDMA (OFDM-FDMA), OFDM-TDMA, or OFDM-CDMA.

According to some example embodiments, the wireless communication device 100 may be a base station (BS) or user equipment (UE) in the wireless communication system. In general, the BS may refer to a fixed station communicating with a UE and/or other BSs, and may exchange data and control information with the UE and/or the other BSs by communicating with the UE and/or the other BSs. For example, the BS may be referred to as a Node B, an evolved-Node B (eNB), a sector, a site, a Base Transceiver System (BTS), an Access Point (AP), a relay node, a Remote Radio Head (RRH), a Radio Unit (RU), or a small cell. According to some example embodiments, the BS or cell may refer to a function or an area covered by a base station controller (BSC) in CDMA, a Node-B in Wide Band CDMA (WCDMA), an eNB or a sector (site) in LTE, and may include a mega cell, a macro cell, a micro cell, a picocell, a femtocell, and/or various coverage areas, e.g., coverage ranges of a relay node, an RRH, an RU, or a small cell.

The UE may be at a fixed location or may be portable and may denote various devices capable of receiving and transmitting data and/or control information from and to the BS by communicating with the BS. For example, the UE may refer to terminal equipment, a Mobile Station (MS), a Mobile Terminal (MT), a User Terminal (UT), a Subscriber Station (SS), a wireless device, or a handheld device.

Referring to FIG. 1, the wireless communication device 100 may include a receiver 102, an antenna array 104, a processor 106 and a memory 108. While FIG. 1 depicts a single receiver, according to some example embodiments, the wireless communication device 100 includes a plurality of receivers 102. Also, while referred to as a receiver herein, the receiver 102 may be a transceiver. Additionally, the number of antennas in the antenna array 104 may vary according to some example embodiments to the extent that the antenna array 104 is able to receive a MIMO spatial multiplexing transmission using the antenna array 104. According to some example embodiments, operations described herein as being performed by the receiver 102 may be performed by at least one processor executing program code that includes instructions corresponding to the operations (e.g., processor 106). The instructions may be stored in a memory of the wireless communication device 100 (e.g., memory 108). The term 'processor,' as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multiprocessor, an application-specific integrated circuit (ASIC), and a field programmable gate array (FPGA).

The receiver 102 may receive a MIMO spatial multiplexing transmission from the antenna array 104. After the transmission is received, the receiver 102 detects the symbols in the transmission using maximal likelihood solutions. According to some example embodiments, the transmission may be modulated using Quadrature Amplitude Modulation (QAM). The detection of the symbols will be discussed further below. Before and/or after detecting the symbols, the receiver 102 may process the received transmission including one or more of amplifying, filtering, mixing, shifting or demodulating. After detecting the symbols in the spatial multiplexing transmission, the receiver 102 decodes the transmission to obtain the transmitted message.

Figure 2:
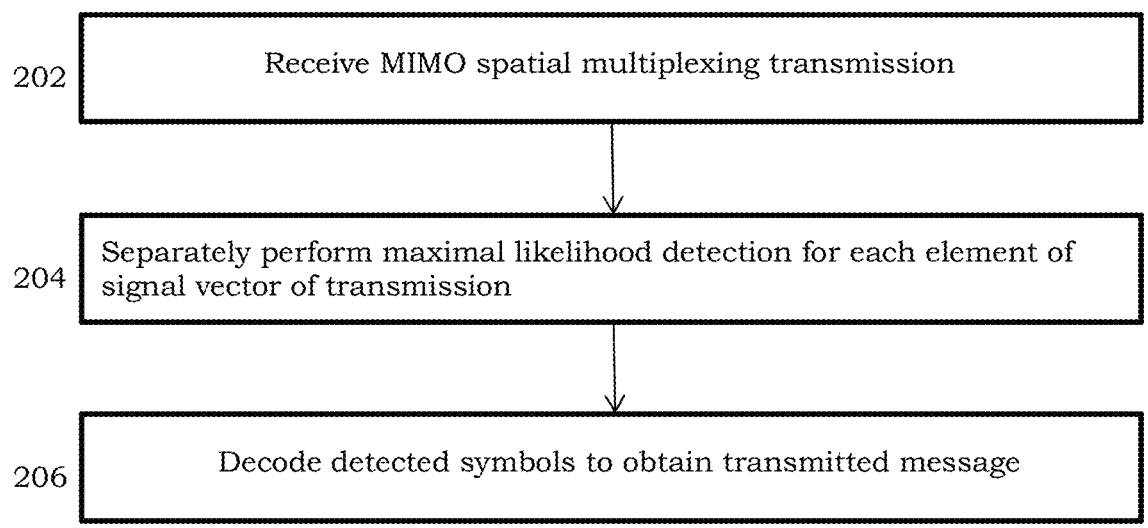
FIG. 2 is a flowchart of a method of detecting symbols in a MIMO spatial multiplexing transmission, according to some example embodiments.
Figure 3:
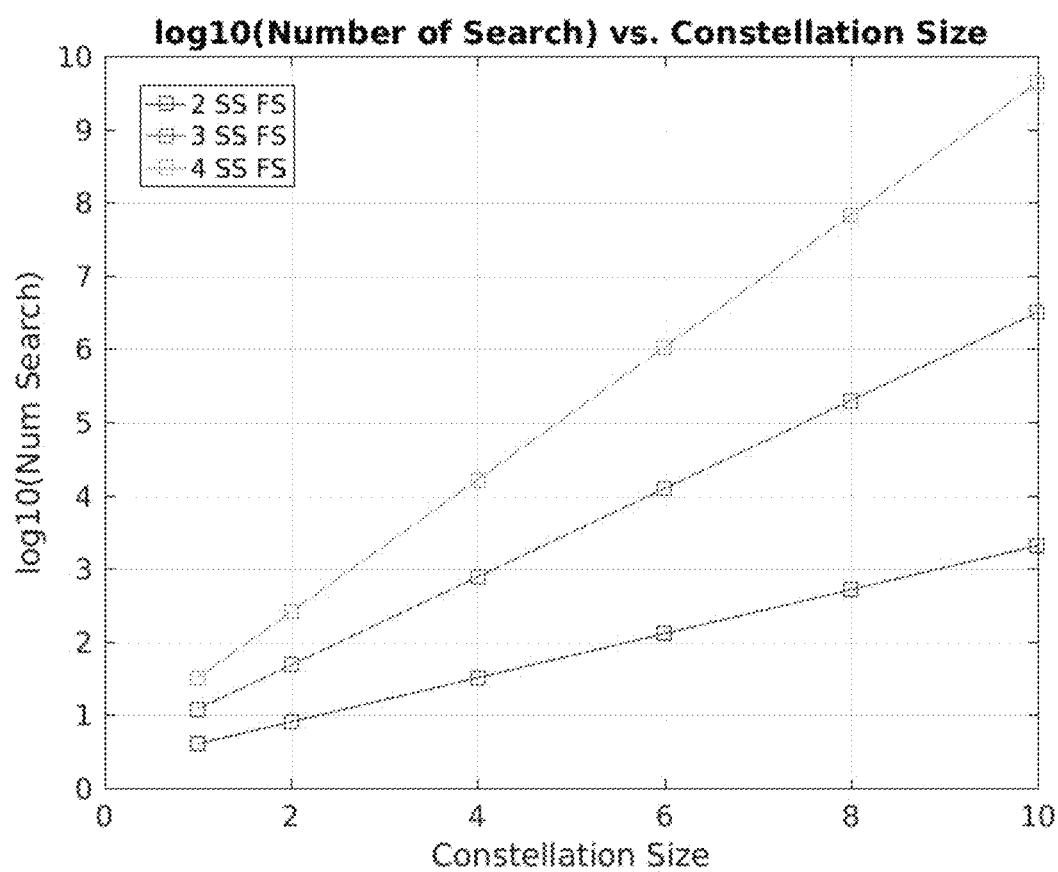
FIG. 3 depicts a relationship between a number of searches performed to determine a symbol using a full search relative to constellation size.
Figure 4:
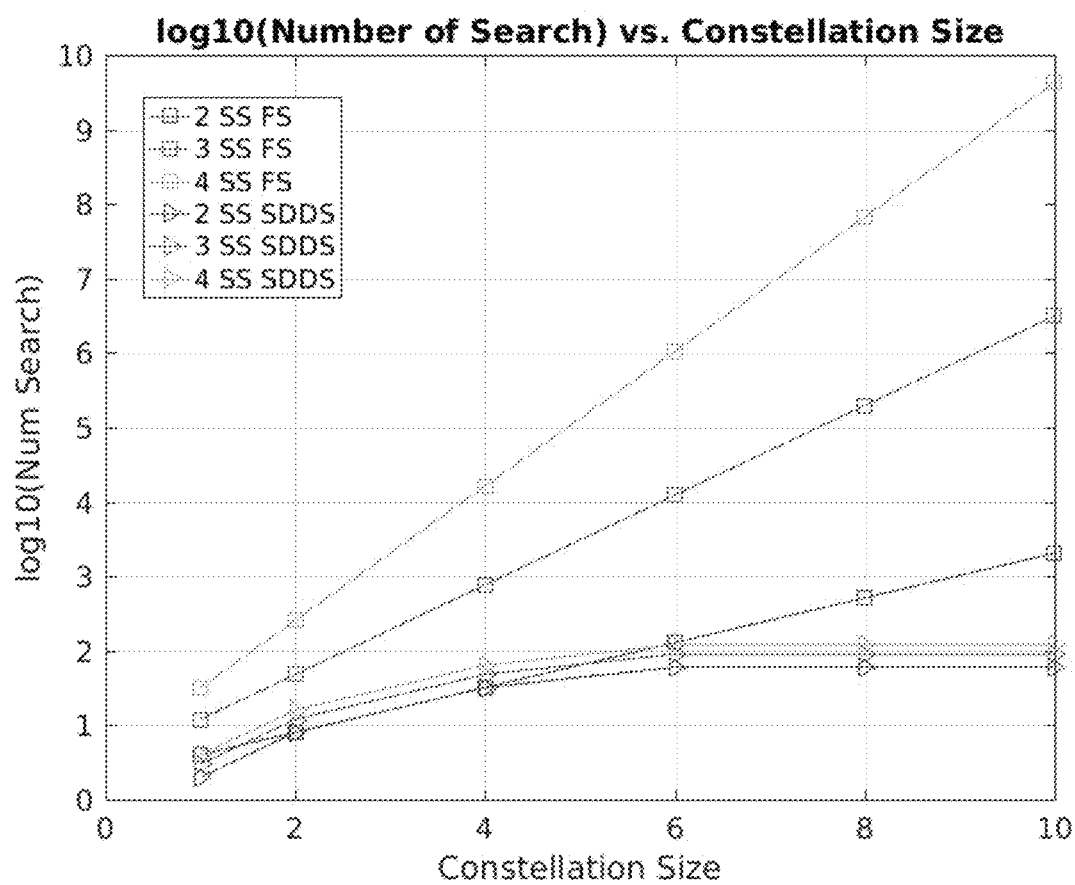
FIG. 4 depicts a comparison between a number of searches performed to detect a symbol using a full search and a number of searches performed to detect a symbol using a single dimension disjoint search.

FIG. 2 is a flowchart of a method of detecting symbols in a MIMO spatial multiplexing transmission, according to some example embodiments. According to some example embodiments, the method of FIG. 2 is performed by a receiver similar to or the same as the receiver 102 of FIG. 1. FIG. 2 will be described with reference to FIGS. 3-4. FIG. 3 depicts a relationship between a number of searches performed to determine a symbol using a multidimensional search (also referred to herein as a "full search") relative to constellation size. FIG. 4 depicts a comparison between a number of searches performed to detect a symbol using a full search and a number of searches performed to detect a symbol using a single dimension disjoint search.

Referring to FIG. 2, in operation 202, the receiver 102 receives a MIMO spatial multiplexing transmission from the antenna array 104. According to some example embodiments, the transmission may include symbols modulated using QAM. MIMO spatial multiplexing transmissions include a signal vector and are received over a channel via a plurality of sub-carriers. The received signal vector on one sub-carrier may be expressed as:

$$Y = H \cdot S + \vec{\eta} \qquad \text{(EQ. 1)}$$

In this signal model, $Y \in C^{N_{rx} \times 1}$ is the received signal vector, $\vec{\eta} \in C^{N_{rx} \times 1}$ is a noise vector, in which each element has independent identical normal distribution.

$H \in C^{N_{rx} \times N_{ss}}$ is a channel matrix, each element in this matrix $h_{i,j}$ denotes a channel coefficient between a $j^{th}$ virtual TX antenna and $i^{th}$ RX antenna.

For example, in a MIMO system having four transmitter antennas and four receiver antennas:

$$\begin{bmatrix} y_1 \\ y_2 \\ y_3 \\ y_4 \end{bmatrix} = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \begin{bmatrix} s_1 \\ s_2 \\ s_3 \\ s_4 \end{bmatrix} + \begin{bmatrix} n_1 \\ n_2 \\ n_3 \\ n_4 \end{bmatrix} \quad \text{(EQ. 2)}$$

Each symbol $s_n$ in the signal vector S corresponds to one of a plurality of symbols of a constellation alphabet corresponding to the modulation of the transmission. The examples provided below correspond to QAM modulation, but any modulation scheme compatible with MIMO transmission, and the methods discussed below, may be used.

According to some example embodiments, channel matrix is an effective channel matrix and may be expressed as $H = H_c \times W$ where $H_c \in C^{N_{tx} \times N_{tx}}$ is the actual channel matrix between physical transmitter (TX) and receiver (RX) antenna arrays, and $W \in C^{N_{tx} \times N_{ss}}$ denotes the effect of a spatial expansion matrix corresponding to beamforming, cyclic shift diversity (CSD), etc. Column vector $\vec{h_i}$ denotes the channel vector from an $i^{th}$ virtual TX antenna to all RX antennas.

Column vector $S \in C^{N_{ss} \times 1}$ is the transmitted QAM symbol vector, each element $s_i$ denotes the QAM symbol transmitted on $i^{th}$ spatial stream and is taken from QAM set $X_i = \{x_1, \ldots, x_{N_i}\}$ of size $N_i$, each element $x_k$ may be referenced by index k. QAM modulation of order M involves mapping M bits, denoted by vector B with each element having a value of '0' or '1', to a QAM symbol taken from set X.

According to some example embodiments, a mapping function may be used to denote Gray mapping $f:B \rightarrow k$. As M bits may be referenced by an index m, the Gray mapping may be viewed as rearranging the order of elements in QAM set X to create a new QAM set X'. The $x_{f(m)}$ in new set X' may be similar to or the same as $x_m$ in the original set X. According to some example embodiments, another mapping function $g:m \rightarrow x_{f(m)}$ may be used to denote the modulation of vector B (denoted by index m) to a QAM symbol $x_{f(m)}$. Based on the value '0' or '1' of the it bit of vector B, an index set for all possible values of B may partitioned into two index sub-sets $I(b_k=0)$ and $I(b_k=1)$. Following the same modulation process, the QAM set may be partition into two sub-sets denoted $X(b_k=0)$ and $X(b_k=1)$ corresponding to the above two index sub-sets.

In operation 204, the receiver 102 separately performs maximal likelihood detection for each element of the signal vector S. The method of operation 204 will be described further in association with FIG. 5.

Referring to FIG. 3, in conventional methods, a single maximal likelihood detection is performed for the entire signal vector S (also referred to herein as a "full search") (FS). A Max-Log-Map detector generates an approximation of the log-likelihood ratio (LLR) for each bit carried on the QAM symbols. Here, we assume the modulation order in each spatial stream is similar or identical and denoted as $M_s$ and the QAM set is denoted as $X_s$. Without loss of generality, the LLR for $k^{th}$ bit in the first spatial stream is expressed as:

$$LLR_{1,k} = \min_{\substack{s_l \in X_s(b_k=1) \\ s_{j,j \neq l} \in X_s}} (|Y - H \cdot S|^2) - \min_{\substack{s_l \in X_s(b_k=0) \\ s_{j,j \neq l} \in X_s}} (|Y - H \cdot S|^2), \quad \text{(EQ. 3)}$$

$$S = [s_1, \ldots, s_{N_{ss}}]^T$$

To obtain one bit log-likelihood ratio (LLR), exhaustive search over all $N_{SS}$, ($N=2^{M_s}$) candidates is performed, resulting in high computation complexity. FIG. 3 depicts the growth of the number of searches as a function of constellation size (e.g., in bits per symbol) per spatial multiplexing order $N_{ss}$. FIG. 3 depicts a relationship between a number of searches performed to determine a symbol using a full search relative to constellation size.

In view of the growing adoption of MIMO, such high computation complexity presents difficulties. For example, MIMO spatial multiplexing has been adopted in WLAN standard 802.11n, 802.11ac and 802.11ax. Both the 802.11ac and 802.11ax standards specify support for up to 8 spatial streams. Accordingly, MIMO applications may involve 1024 QAM with spatial multiplexing for 8 spatial streams. Conventional methods used in such applications would result in excessive demands on processing and power resources, as well as high symbol detection delay.

However, referring back to FIG. 2, in operation 204, the receiver 102 separately performs maximal likelihood detection for each element of the signal vector S (also referred to herein as a single dimension disjoint search) (SDDS). In so doing, the receiver 102 converts the multidimensional search space represented by the signal vector S into a plurality of disjoint, single dimension search spaces. This search dimension reduction technique reduces the order of complexity from $O(M^L)$ to $O(L \cdot M)$. Using SDDS, the receiver 102 detects the symbols included in the signal vector S.

Referring to FIG. 4, a comparison between a number of searches performed to detect a symbol using a full search and a number of searches performed to detect a symbol using SDDS is depicted. As may be seen with reference to FIG. 4, the SDDS enables detection of the symbol using fewer searches. Thereby, the SDDS provides for faster symbol detection, and reduces demands on processing and power resources.

Referring back to FIG. 2, in operation 206, the receiver 102 decodes the detected symbols to obtain the transmitted message. At this juncture, the method depicted by FIG. 2 may either end or repeat.

Figure 5:
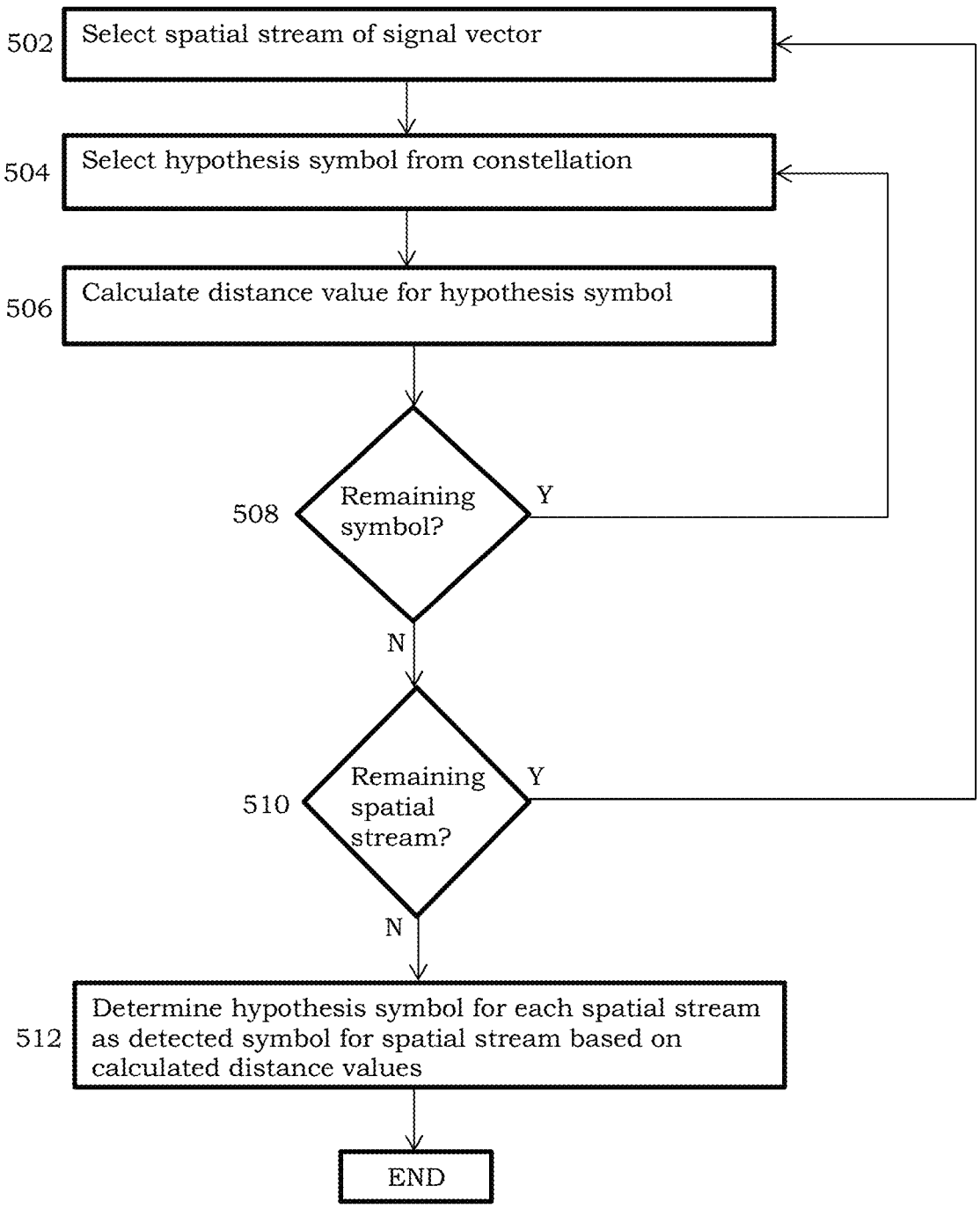
FIG. 5 is a flowchart of a method of detecting symbols in a MIMO spatial multiplexing transmission using a single dimension disjoint search, according to some example embodiments.

FIG. 5 is a flowchart of a method of detecting symbols in a MIMO spatial multiplexing transmission using a single dimension disjoint search, according to some example embodiments. According to some example embodiments, the method of FIG. 5 is performed by a receiver similar to or the same as the receiver 102 of FIG. 1. According to some example embodiments, the method of FIG. 5 may correspond to and/or further define operation 204 of FIG. 2.

In operation 502, the receiver 102 selects a spatial stream of the plurality of spatial streams of the signal vector S. By selecting spatial streams individually, the receiver 102 converts the multidimensional search space represented by the signal vector S into a plurality of disjoint, single dimension search spaces. For example, the signal vector S includes a plurality of symbols (also referred to herein as "bit positions"), each corresponding to a spatial stream. The receiver 102 designates each spatial stream of the signal vector S as a separate search space. In so doing, each single dimension search space may be represented by the below linear system function.

$$Y = H \cdot S_{\bar{m}|s_m} + \vec{\eta} \quad \text{(EQ. 4)}$$

Where $S_{\bar{m}|s_m}$ is a column vector $S_{\bar{m}} \in C^{N_{ss} \times 1}$ with an $m^{th}$ row element fixed to a value $s_m$. This is an equivalent to the below linear system with dimension reduced by one:

$$Y - H(:,m)s_m = H_{\bar{m}} \cdot S_{\bar{m}} + \vec{\eta} \quad \text{(EQ. 5)}$$

where $H_{\overline{m}}$ is obtained by removing the $m^{th}$ column of H; and $S_T$ is $C^{(N_r-1) \times 1}$. Any linear method, including linear methods with feedback such as successive interference cancellation, may be applied to find a solution for $\hat{S}_{\overline{m}|s_m} = g(Y, H, s_m)$. According to some example embodiments, $S_{\overline{m}}$ may be determined using minimum mean square error (MMSE) or MMSE with successive interference cancellation (SIC). Therefore, the search for a lowest distance for the $m^{th}$ layer in the original function depicted in EQ. 3 may be restricted to one dimension, as shown in EQ. 6.

$$LLR_{l,k} = \min_{\substack{s_l \in X_s(b_k=1) \\ \hat{s}_{\overline{l}|s_l} = g(Y,H,s_l)}} (|Y - H \cdot S|^2) - \min_{\substack{s_l \in X_s(b_k=0) \\ \hat{s}_{\overline{l}|s_l} = g(\&Y,H,s_l)}} (|Y - H \cdot S|^2), \quad (EQ.\ 6)$$

$$S = [s_l, \ldots, s_{N_{ss}}]^T, l = [1 \ldots N_{ss}]$$

According to some example embodiments, the search for the lowest distance for every spatial stream and every bit position is carried out for every per dimensional search. According to some example embodiments, as discussed further below, a candidate search space may be determined after performing multiple one-dimensional searches and before finding the lowest distance per bit position per spatial stream.

According to some example embodiments, the receiver 102 selects each spatial stream as ordered in the signal vector S. In operation 504, the receiver 102 selects a symbol from among a constellation of symbols as a hypothesis symbol. The constellation of symbols may be associated with the modulation scheme of the transmission. According to some example embodiments, the constellation may correspond to QAM modulation. According to some example embodiments, the modulation scheme may be known to the receiver 102. According to some example embodiments, the modulation scheme may be determined by the receiver 102 using data included in the transmission and/or data provided in addition to the transmission. Although the discussion in association with FIG. 5 describes selecting hypothesis symbol from among an entire constellation of symbols, according to some example embodiments, as discussed further below, a search space from which the hypothesis symbol is selected may be a defined subset of the constellation of symbols.

In operation 506, the receiver 102 calculates a distance value for the hypothesis symbol using EQ. 6. In operation 508, the receiver 102 determines whether there is any remaining symbol in the constellation not previously selected. If the receiver 102 determines that there is at least one remaining symbol in the constellation not previously selected, the method returns to operation 504 in which the receiver 102 selects a previously unselected hypothesis symbol. Otherwise, if the receiver 102 determines that all of the symbols in the constellation have been previously selected, in operation 510, the receiver 102 determines whether there is any remaining spatial stream of the signal vector S not previously selected. If the receiver 102 determines that there is at least one remaining spatial stream of the signal vector S not previously selected, the method returns to operation 502 in which the receiver 102 selects a previously unselected spatial stream. Otherwise, if the receiver 102 determines that all of the spatial streams of the signal vector S have been previously selected, the method advances to operation 512.

In operation 512, the receiver 102 determines a hypothesis symbol for each spatial stream as the detected symbol for the respective spatial stream based on the distance values calculated in operation 506. According to some example embodiments, the receiver 102 determines a combined distance value for each possible combination of hypothesis symbols for the spatial streams of the signal vector S, the combined distance value representing the sum of the distance values determined in operation 506 for the respective hypothesis symbols in the combination of hypothesis symbols. For example, in determining each combined distance value, each of the spatial streams of the signal vector S may be associated with a corresponding hypothesis symbol in a combination of hypothesis symbols, and the combined distance value is the sum of the distance values of all of the hypothesis symbols in the combination of hypothesis symbols. The receiver 102 determines the combination of hypothesis symbols that provides the lowest combined distance value as the detected symbols for the spatial streams of the signal vector S. After the symbols are detected for the spatial streams of the signal vector S in operation 512, the method ends.

According to some example embodiments, in operation 502, the receiver 102 may further reduce each of the plurality of disjoint, single dimension search spaces to a smaller candidate set for each of the spatial streams $\Omega_l$. Using such an approach, in operation 506, the receiver 102 determines a distance value for the hypothesis symbol using EQ. 7 below instead of EQ. 6.

$$LLR_{l,k} = \min_{\substack{s_l \in \Omega_l(b_k=1) \\ \hat{s}_{\overline{l}|s_l} = g(Y,H,s_l)}} (|Y - H \cdot S|^2) - \min_{\substack{s_l \in \Omega_l(b_k=0) \\ \hat{s}_{\overline{l}|s_l} = g(\&Y,H,s_l)}} (|Y - H \cdot S|^2), \quad (EQ.\ 7)$$

To reduce a search space to a smaller candidate set, a search radius is defined with respect to a search center for each spatial stream of the signal vector S. The search center, $q_{mmse}$, for each spatial stream, is defined as an MMSE detection result of the spatial stream. According to some example embodiments, the search radius defined with respect to the search center is a fixed radius. The fixed radius may be determined based on a trade-off between resource conservation and detection performance. The candidate set for each spatial stream includes all candidate symbols of the constellation included within the search radius from the search center.

As discussed above, converting the multidimensional search space represented by the signal vector S into a plurality of disjoint, single dimension search spaces reduces the order of complexity from $O(M^L)$ to $O(L \cdot M)$. Additionally, by reducing the search space to a smaller candidate set, the order of complexity may be further reduced to $O(L \cdot N)$; $N \ll M$, where N is a parameter corresponding to search space and reflects a trade-off between complexity and performance loss.

According to some example embodiments, the search radius for each spatial stream may be adaptively determined based on a post-equalization signal-to-noise ratio (SNR) for the spatial stream. For example, for a given post-equalization SNR, different search radii correspond to different probabilities of detecting the symbol of the spatial stream, where a larger radius corresponds to a higher probability of detecting symbol. While the discussion herein refers to post-equalization SNR, according to some example embodiments, the SNR may be a type of SNR other than post-equalization SNR. According to some example embodiments, the post-equalization SNR is determined based on the channel matrix and noise vector of the transmission. According to some example embodiments, for a given application, an acceptable probability of detecting the symbol for the spatial stream is heuristically determined. The acceptable probability is then used in combination with the determined post-equalization SNR for a spatial stream to adaptively determine the search radius for the spatial stream. According to some example embodiments, the receiver 102 may generate or obtain a table mapping search radius to post-equalization SNR, according to the acceptable probability.

According to some example embodiments, reducing the search space to a smaller candidate set may include defining an adaptive search space for each spatial stream. By defining the adaptive search space for each spatial stream, limited resources for symbol detection are allocated for the detection of each spatial stream based on the post-equalization SNR. Further discussion regarding adaptive search space definition is provided below in association with FIGS. 6-7.

Figure 6:
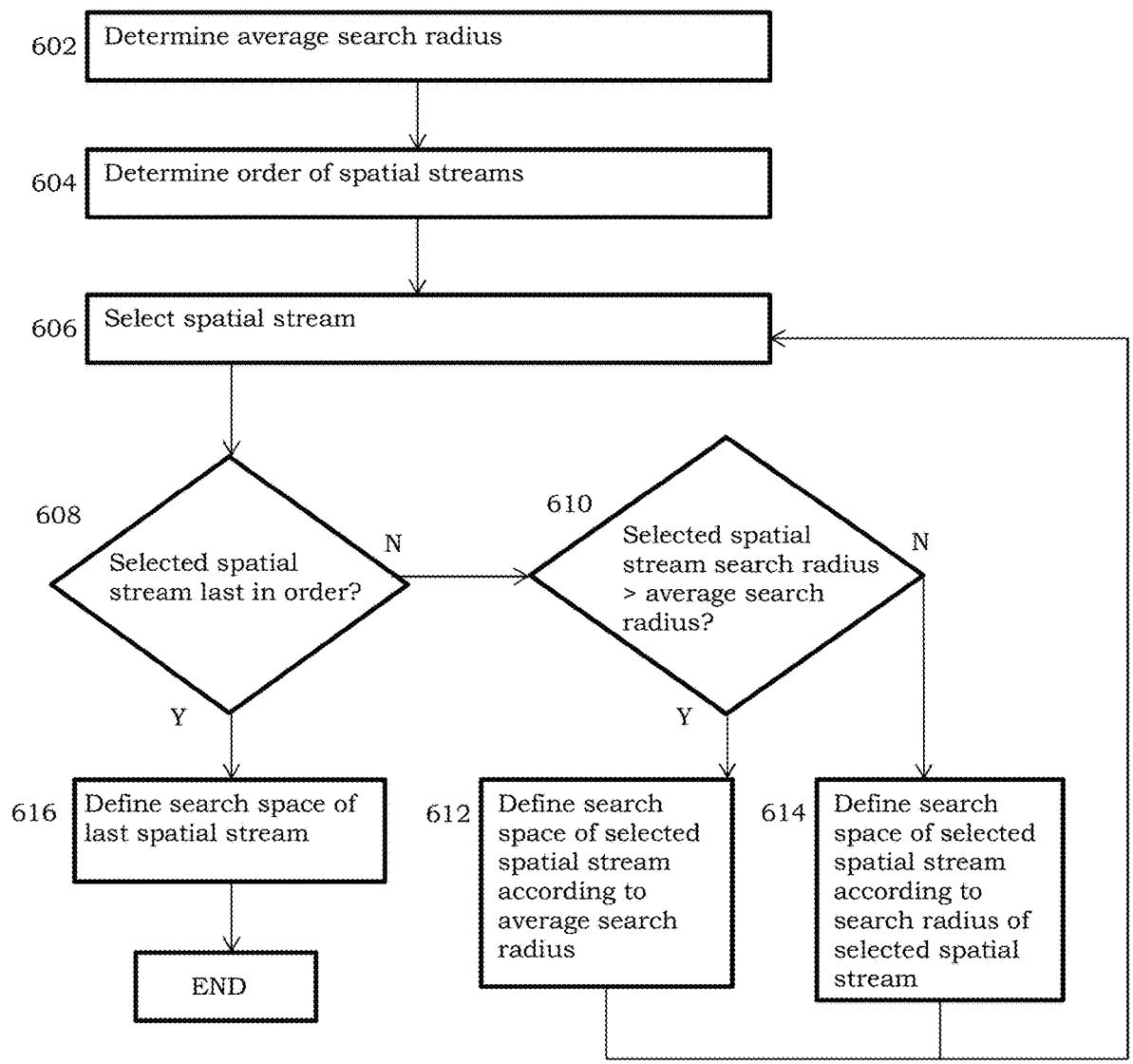
FIG. 6 is a flowchart of a method of defining an adaptive search space by ordering the spatial streams by post-equalization signal-to-noise ratio (SNR), according to some example embodiments.

FIG. 6 is a flowchart of a method of defining adaptive search spaces for the spatial streams by ordering the spatial streams by post-equalization signal-to-noise ratio (SNR), according to some example embodiments. According to some example embodiments, the method of FIG. 6 is performed by a receiver similar to or the same as the receiver 102 of FIG. 1. According to some example embodiments, the method of FIG. 6 may correspond to and/or further define operation 502 of FIG. 5.

By defining the adaptive search space for each spatial stream, limited resources for symbol detection are allocated for the detection of each spatial stream. A total number of available searches, $N_{tot}$, may be defined based on resource constraints. For example, $N_{tot}$ may be defined based on processing, memory and/or energy resource constraints. According to some example embodiments, the total number of available searches may correspond to a total number of hypothesis symbols for which a distance value is calculated over all of the spatial streams of the signal vector S. The total number of available searches may be allocated across the spatial streams of the signal vector S based on the following constraint:

$$\sum_{l=1...M} N_o(q_{mmse,l}, R_o(\gamma_l)) \leq N_{tot} \qquad (EQ. 8)$$

where $N_o$ ($q_{mmse,l}$, $R_o(\gamma_l)$) represents the actual number of candidate searches (also referred to herein as the quantity of "candidate symbols" or "hypothesis symbols") used for the l'th spatial stream with post-equalisation SNR $\gamma_l$, and $R_o$ represents the search radius for the l'th spatial stream.

Referring to FIG. 6, in operation 602, the receiver 102 determines an average search radius based on the search radii for each of the spatial streams in the signal vector S. The search radii may be determined as discussed above in association with FIG. 5. In operation 604, the receiver 102 determines an order of the spatial streams based on post-equalization SNR, such that the first spatial stream corresponds to the highest post-equalization SNR and the last spatial stream corresponds to the lowest post-equalization SNR.

In operation 606, the receiver 102 selects a spatial stream. The receiver 102 may select the spatial stream as the spatial stream highest in the order determined in operation 604 that has not been previously selected. In operation 608, the receiver 102 determines whether the selected spatial stream is the last spatial stream in the order determined in operation 604. If the selected spatial stream is not the last spatial stream, the method advances to operation 610. If the selected spatial stream is the last spatial stream, the method advances to operation 616.

In operation 610, the receiver 102 determines whether the search radius of the selected spatial stream is greater than the average search radius. If the search radius of the selected spatial stream is greater than the average search radius, in operation 612, the receiver 102 defines the search space of the selected spatial stream as the candidate symbol set included within the radius of the average search radius. Otherwise, if the search radius of the selected spatial stream is less than or equal to the average search radius, in operation 614, the receiver 102 defines the search space of the selected spatial stream as the candidate symbol set included within the search radius of the selected spatial stream. After the receiver 102 defines the search space of the selected spatial stream in operation 610, the method returns to operation 606 to select the next spatial stream in the order determined in operation 604.

In operation 616, the receiver 102 defines the search space of the last spatial stream by determining the number of remaining searches in the total available number of searches. According to some example embodiments, the receiver 102 determines the sum of the quantity of candidate symbols in each of the defined search spaces of the previously selected spatial streams, and subtracts this sum from the total number of available searches. For example, the search space for the last spatial stream may be defined by:

$$N_o(M) = N_{tot} - \sum_{l=1...M-1} N_o(q_{mmse,l}, R_o(l)) \qquad (EQ. 9)$$

where $N_o(M)$ defines the number of remaining searches, or a quantity of candidate symbols in the search space of the last spatial stream. According to some example embodiments, the quantity of candidate symbols defines a modified search radius from the search center of the last spatial stream corresponding to a radius sufficient to include the quantity of candidate symbols within the radius. Accordingly, the receiver 102 defines the search space of the last spatial stream as the candidate symbol set included within the radius from the search center of the last spatial stream sufficient to include the determined quantity of candidate symbols. After the receiver 102 defines the search space of the last spatial stream, the method ends.

As discussed above, for a given post-equalization SNR, different search radii correspond to different probabilities of detecting the symbol of the spatial stream, where a larger radius corresponds to a higher probability of detecting symbol. However, given that different spatial streams may have different post-equalization SNRs, adopting a fixed search radius for all spatial streams in the signal vector S would result in low probabilities of symbol detection of spatial streams with low post-equalization SNR, and high probabilities of symbol detection of spatial stream with high post-equalization SNR. Accordingly, the above-described method defines an adaptive search space such that spatial streams with high post-equalization SNR have smaller search radii and spatial streams with low post-equalization SNR have larger search radii. In so doing, the above-described method defines a search spaces for the spatial streams, such that each spatial stream has a similar probability of symbol detection, or the same probability of symbol detection, consistent with the resources available for symbol detection represented by the total number of available searches.

Figure 7:
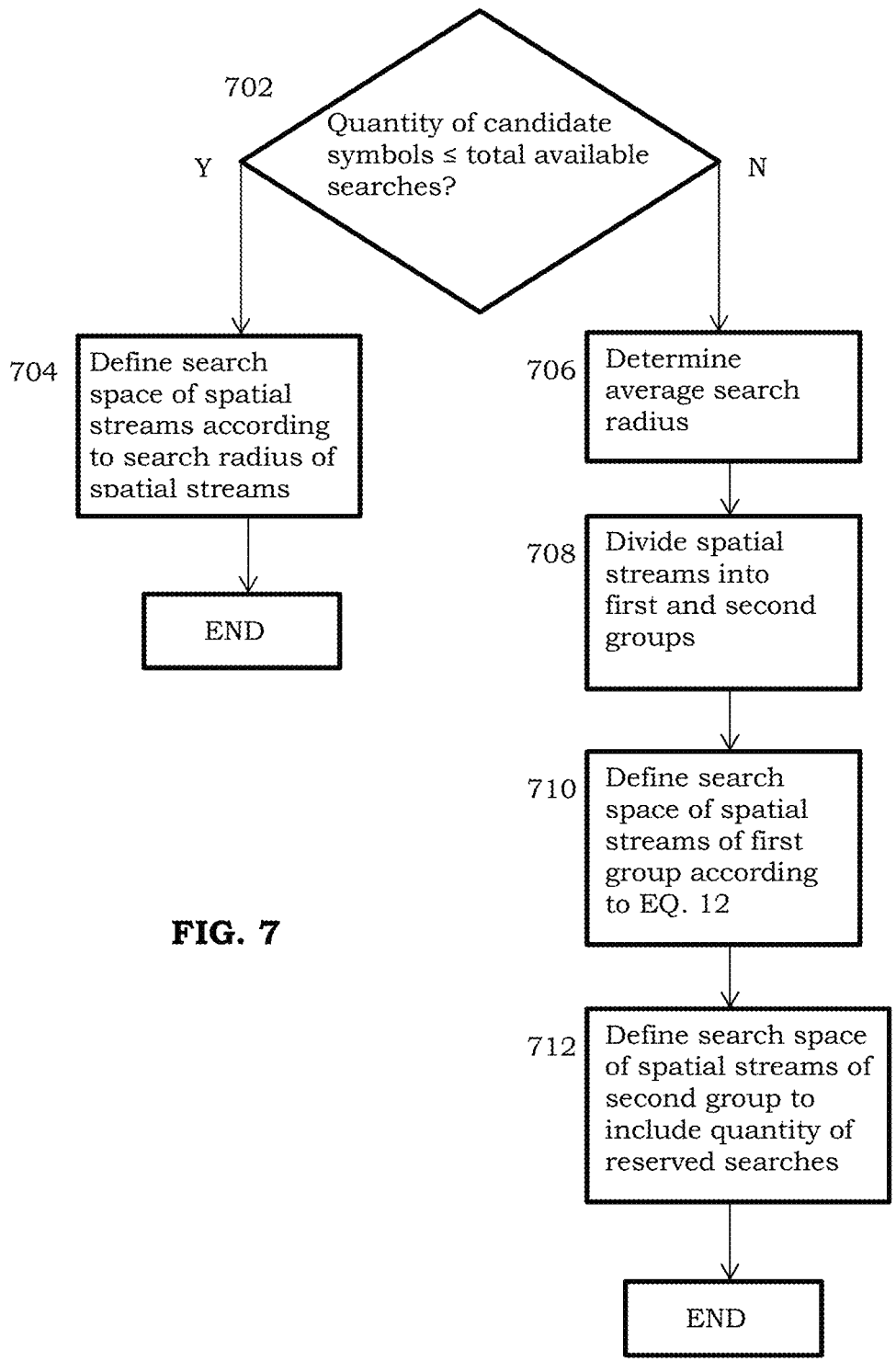
FIG. 7 is a flowchart of a method of defining an adaptive search space by grouping the spatial streams based on an average search radius, according to some example embodiments.

FIG. 7 is a flowchart of a method of defining adaptive search spaces for the spatial streams by grouping the spatial streams based on an average search radius, according to some example embodiments. According to some example embodiments, the method of FIG. 7 is performed by a receiver similar to or the same as the receiver 102 of FIG. 1. According to some example embodiments, the method of FIG. 7 may correspond to and/or further define operation 502 of FIG. 5.

Referring to FIG. 7, in operation 702, the receiver 102 determines whether a sum of the quantity of candidate symbols included within each of the search radii of the spatial streams of signal vector S is less than or equal to the total number of available searches (discussed in association with FIG. 6). The search radii may be determined as discussed above in association with FIG. 5. As discussed above, the candidate set for each spatial stream includes all candidate symbols of the constellation included within the search radius from the search center.

If the sum of the quantity of candidate symbols included within each of the search radii of the spatial streams is less than or equal to the total number of available searches, in operation 704, the receiver 102 may define the search spaces of the spatial streams as the candidate symbol sets included within the search radius of the respective spatial stream. For example, the receiver 102 may determine the following:

$$\sum_{l=1...M} N(q_{mmse,l}, R(\gamma_l)) \leq N_{tot} \quad \text{(EQ. 10)}$$

According to some example embodiments, if the sum of the quantity of candidate symbols included within each of the search radii of the spatial streams is less than the total number of available searches, the receiver 102 increases the search spaces of the spatial streams having the lowest post-equalization SNR. For example, the receiver 102 may increase the search spaces of the spatial stream having the lowest post-equalization SNR, or the search spaces of the two spatial streams having the lowest post-equalization SNR. The receiver 102 may increase the search spaces of the spatial streams having the lowest post-equalization SNR by the difference between the sum of the quantity of candidate symbols included within each of the search radii of the spatial streams and the total number of available searches. If the sum of the quantity of candidate symbols included within each of the search radii of the spatial streams is less than or equal to the total number of available searches, after the receiver 102 defines the search spaces of the spatial streams, the method ends. Otherwise, if the sum of the quantity of candidate symbols included within each of the search radii of the spatial streams is greater than the total number of available searches, the method advances to operation 706. For example, if the receiver 102 determines the following:

$$\sum_{l=1...M} N(q_{mmse,l}, R(\gamma_l)) = N_a > N_{tot} \quad \text{(EQ. 11)}$$

the method advances to operation 706.

In operation 706, the receiver 102 determines an average search radius based on the search radii for each of the spatial streams in the signal vector S. Next, in operation 708, the receiver 102 divides the spatial streams into a first group and a second group. The first group includes spatial streams having a search radius greater than the average search radius. The second group includes spatial streams having a search radius less than or equal to the average search radius.

In operation 710, the receiver 102 defines the search space of each of the spatial streams in the first group according to EQ. 12 below:

$$N_o(q_{mmse,l}) = \left\lfloor \frac{N(q_{mmse,l}, R(\gamma_l)) \cdot N_{tot}}{N_a} \right\rfloor \quad \text{(EQ. 12)}$$

where $N_a$ represents the sum of the quantity of candidate symbols included within each of the search radii of the spatial streams, and $N_o$ represents a modified quantity of candidate symbols defining the search space for the respective spatial stream. The modified quantity of candidate symbols defines a search radius from the search center of the respective spatial stream corresponding to a radius sufficient to include the modified quantity of candidate symbols within the radius. Accordingly, the receiver 102 defines the search space of each spatial stream as the candidate symbol set included within the radius from the search center of the respective spatial stream sufficient to include the modified quantity of candidate symbols. According to some example embodiments, the receiver 102 defines the search space of each of the spatial streams in the first group in decreasing order of post-equalization SNR. According to some example embodiments, the sum of the quantity of candidate symbols included within each of the search radii of the spatial streams in the first group is greater than the sum of the quantity of candidate symbols in each of the search spaces of the spatial streams in the first group defined by the receiver 102 in operation 708.

In operation 712, the receiver 102 defines the search space of each of the spatial streams in the second group. According to some example embodiments, the receiver 102 determines a quantity of reserved searches corresponding to the difference between the sum of the quantity of candidate symbols included within each of the search radii of the spatial streams in the first group and the sum of the modified quantity of candidate symbols in each of the search spaces of the spatial streams in the first group defined by the receiver 102 in operation 710.

In operation 712, the receiver 102 then allocates the quantity of reserved searches to one or more spatial streams in the second group to increase the search spaces of the one or more spatial streams. According to some example embodiments, the receiver 102 defines the search space of one or more spatial streams in the second group by determining a number of searches of each of the one or more spatial streams as the sum of the number of candidate symbols included within the search radius of the respective spatial stream and at least a portion of the quantity of reserved searches. As discussed above, the quantity of candidate symbols (also referred to herein as the number of searches) defines a search radius from the search center of the respective spatial stream corresponding to a radius sufficient to include the quantity of candidate symbols within the radius. Accordingly, the receiver 102 defines the search space of each of the one or more spatial streams as the candidate symbol set included within a radius from the search center of the respective spatial stream sufficient to include the determined number of searches. The receiver 102 defines the search spaces of the spatial streams in the second group, exclusive of the one or more spatial streams, as the candidate symbol set included within the search radius of the respective spatial stream.

According to some example embodiments the receiver 102 defines the search spaces of the spatial streams in the second group, exclusive of the spatial stream having the lowest post-equalization SNR, as the candidate symbol set included within the search radius of the respective spatial stream. In this case, the receiver 102 may determine a number of searches of the spatial stream having the lowest post-equalization SNR as the sum of the number of candidate symbols included within the search radius of the spatial stream having the lowest post-equalization SNR and the quantity of reserved searches. As discussed above, the quantity of candidate symbols (also referred to herein as the number of searches) defines a search radius from the search center of the respective spatial stream corresponding to a radius sufficient to include the quantity of candidate symbols within the radius. Accordingly, the receiver 102 defines the search space of the spatial stream having the lowest post-equalization SNR as the candidate symbol set included within a radius from the search center of the spatial stream having the lowest post-equalization SNR sufficient to include the determined number of searches. After the receiver 102 defines the search spaces of the spatial streams in the second group in operation 712, the method ends.

As discussed above in association with FIG. 6, for a given post-equalization SNR, different search radii correspond to different probabilities of detecting the symbol of the spatial stream, where a larger radius corresponds to a higher probability of detecting symbol. However, given that different spatial streams may have different post-equalization SNRs, adopting a fixed search radius for all spatial streams in the signal vector S would result in low probabilities of symbol detection of spatial streams with low post-equalization SNR, and high probabilities of symbol detection of spatial stream with high post-equalization SNR. Accordingly, the above-described method defines an adaptive search space such that spatial streams with high post-equalization SNR have smaller search radii and spatial streams with low post-equalization SNR have larger search radii. In so doing, the above-described method defines a search spaces for the spatial streams, such that each spatial stream has a similar probability of symbol detection, or the same probability of symbol detection, consistent with the resources available for symbol detection represented by the total number of available searches.

The various operations of methods described above may be performed by any suitable means capable of performing the operations, such as various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with some example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While some example embodiments have been particularly shown and described with reference to the figures, it will be understood by those of ordinary skill in the art that various changes in form and details may be made therein without departing from the spirit and scope as defined by the following claims.

What is claimed is:

1. A wireless communication device, comprising:
a memory storing computer-readable instructions; and
at least one processor coupled to the memory and configured to execute the computer-readable instructions to
select a spatial stream among a plurality of spatial streams, the plurality of spatial streams being included in a received signal vector, the received signal vector being associated with a symbol constellation,
calculate a plurality of distance values, each distance value representing a distance between the selected spatial stream and a different hypothesis symbol among a plurality of hypothesis symbols, the plurality of hypothesis symbols corresponding to the symbol constellation,
repeat the selection and the calculation for all spatial streams among the plurality of spatial streams not previously selected, and
determine a detected symbol of each spatial stream among the plurality of spatial streams based on the plurality of distance values calculated for the plurality of spatial streams.

2. The wireless communication device according to claim 1, wherein:
the received signal vector is included in a multiple-input multiple-output (MIMO) spatial multiplexing transmission and received via an antenna array, and
the at least one processor is further configured to execute the computer-readable instructions to:
decode the detected symbol to obtain a message included in the received signal vector.

3. The wireless communication device according to claim 2, wherein:
the plurality of hypothesis symbols includes all symbols included in the symbol constellation; and
the calculation of the plurality of distance values is performed with respect to all of the plurality of hypothesis symbols such that each distance value of the plurality of distance values corresponds to a respective hypothesis symbol of the plurality of hypothesis symbols.

4. The wireless communication device according to claim 1, wherein:
the plurality of hypothesis symbols does not include all symbols in the symbol constellation; and
the calculation of the plurality of distance values is performed with respect to all of the plurality of hypothesis symbols such that each distance value of the plurality of distance values corresponds to a respective hypothesis symbol of the plurality of hypothesis symbols.

5. The wireless communication device according to claim 4, wherein:
the plurality of hypothesis symbols includes all of the hypothesis symbols included within a search radius defined with respect to a search center, the search center being defined based on a minimum mean square error (MMSE) detection result of the selected spatial stream, and the search radius being a determined fixed radius.

6. The wireless communication device according to claim 4, wherein:
the plurality of hypothesis symbols includes all of the hypothesis symbols included within a search radius defined with respect to a search center, the search center being defined based on a MMSE detection result of the selected spatial stream, and the search radius being determined based on a signal-to-noise ratio (SNR) for the selected spatial stream.

7. The wireless communication device according to claim 6, wherein the search radius is determined based on the SNR for the selected spatial stream and a determined acceptable probability of detecting a symbol of the selected spatial stream.

8. The wireless communication device according to claim 1, wherein the at least one processor is further configured to execute the computer-readable instructions to:
determine a plurality of search radii including a search radius of each spatial stream of the plurality of spatial streams;
determine an average search radius based on the plurality of search radii;
define a first plurality of search spaces of each spatial stream of a set of first spatial streams among the plurality of spatial streams having a search radius greater than the average search radius, the set of first spatial streams not including the spatial stream associated with the lowest SNR;
define a second plurality of search spaces of each spatial stream of a set of second spatial streams among the plurality of spatial streams having a search radius less than or equal to the average search radius, the set of second spatial streams not including the spatial stream associated with the lowest SNR; and
define a search space of the spatial stream associated with the lowest SNR, and
wherein the plurality of hypothesis symbols includes the hypothesis symbols defined in a selected search space of the selected spatial stream among the first plurality of search spaces, the second plurality of search spaces and the search space of the spatial stream associated with the lowest SNR.

9. The wireless communication device according to claim 8, wherein the at least one processor is further configured to execute the computer-readable instructions to:
determine an order of the plurality of spatial streams based on an SNR associated with each spatial stream of the plurality of spatial streams, the spatial stream associated with the lowest SNR being ordered last, and
wherein the first plurality of search spaces, the second plurality of search spaces and the search space of the spatial stream associated with the lowest SNR are defined according to the order.

10. The wireless communication device according to claim 8, wherein the definition of the first plurality of search spaces includes all hypothesis symbols of the symbol constellation included within the average search radius from a search center of each respective spatial stream of the set of first spatial streams, each search center being defined based on a MMSE detection result of the respective spatial stream of the set of first spatial streams.

11. The wireless communication device according to claim 8, wherein the definition of the second plurality of search spaces includes all hypothesis symbols of the symbol constellation included within the search radius of each respective spatial stream of the set of second spatial streams from a search center of the respective spatial stream of the set of second spatial streams, each search center being defined based on a MMSE detection result of the respective spatial stream of the set of second spatial streams.

12. The wireless communication device according to claim 8, wherein the definition of the search space of the spatial stream associated with the lowest SNR includes:
determining a total quantity of hypothesis symbols included in the first plurality of search spaces and the second plurality of search spaces,
subtracting the total quantity of hypothesis symbols from a total number of available searches to obtain a quantity of candidate symbols,
determining a modified search radius of the spatial stream associated with the lowest SNR as a radius sufficient to include the quantity of candidate symbols, and
defining the search space of the spatial stream associated with the lowest SNR as including all of the hypothesis symbols of the symbol constellation included within the modified search radius from a search center of the spatial stream associated with the lowest SNR, the search center being defined based on a MMSE detection result of the spatial stream associated with the lowest SNR.

13. The wireless communication device according to claim 12, wherein the total number of available searches is defined according to resource constraints of the wireless communication device.

14. The wireless communication device according to claim 1, wherein the at least one processor is further configured to execute the computer-readable instructions to:
determine a plurality of search radii including a search radius of each spatial stream of the plurality of spatial streams;
determine a sum of a total quantity of candidate symbols included in each search radius of each respective spatial stream of the plurality of spatial streams;
determine whether the sum is greater than a total number of available searches;
determine an average search radius based on the plurality of search radii in response to a determination that the sum is greater than a total number of available searches;
define a first plurality of search spaces of each spatial stream of a set of first spatial streams among the plurality of spatial streams having a search radius greater than the average search radius; and
define a second plurality of search spaces of each spatial stream of a set of second spatial streams among the plurality of spatial streams having a search radius less than or equal to the average search radius, and
wherein the plurality of hypothesis symbols includes the hypothesis symbols defined in a selected search space of the selected spatial stream among the first plurality of search spaces and the second plurality of search spaces.

15. The wireless communication device according to claim 14, wherein the total number of available searches is defined according to resource constraints of the wireless communication device.

16. The wireless communication device according to claim 15, wherein the definition of the first plurality of search spaces includes:
  determining a first modified quantity of candidate symbols for each respective spatial stream among the set of first spatial streams based on the total quantity of candidate symbols included in the search radius of the respective spatial stream among the set of first spatial streams and the total number of available searches;
  determining a first modified search radius of the respective spatial stream among the set of first spatial streams as a radius sufficient to include the first modified quantity of candidate symbols; and
  defining a search space of the respective spatial stream among the set of first spatial streams as including all of the hypothesis symbols of the symbol constellation included within the first modified search radius from a search center of the respective spatial stream among the set of first spatial streams, the search center being defined based on a MMSE detection result of the respective spatial stream among the set of first spatial streams.

17. The wireless communication device according to claim 16, wherein the definition of the second plurality of search spaces includes:
  determining a quantity of reserved searches as a difference between a sum of a total quantity of candidate symbols included in each search radius of each respective spatial stream among the set of first spatial streams and a sum of a total quantity of first modified candidate symbols for each respective spatial stream among the set of first spatial streams;
  defining one or more of the second plurality of search spaces of one or more spatial streams among the set of second spatial streams by
    determining a second modified quantity of candidate symbols for each spatial stream of the one or more spatial streams as a sum of a quantity of candidate symbols included within the search radius of the one or more spatial streams at a portion of the quantity of reserved searches,
    determining a second modified search radius of the one or more spatial streams as a radius sufficient to include the second modified quantity of candidate symbols, and
    defining a search space of the one or more spatial streams as including all of the hypothesis symbols of the symbol constellation included within the second modified search radius from a search center of the one or more spatial streams, the search center being defined based on a MMSE detection result of the one or more spatial streams; and
  defining the second plurality of search spaces, exclusive of the one or more of the second plurality of search spaces, of the spatial streams among the set of second spatial streams, exclusive of the one or more spatial streams, as including all of the hypothesis symbols of the symbol constellation included within the search radius of each respective spatial stream of the set of second spatial streams from a search center of the respective spatial stream of the set of second spatial streams, each search center being defined based on a MMSE detection result of the respective spatial stream of the set of second spatial streams.

18. The wireless communication device according to claim 1, wherein the determination of the detected symbol for each spatial stream among the plurality of spatial streams includes:
  determining a plurality of combined distance values, each combined distance value corresponding to a different combination of hypothesis symbols of the plurality of hypothesis symbols, each combination of hypothesis symbols including a hypothesis symbol for each spatial stream among the plurality of spatial streams, each combined distance value representing a sum of distance values of the calculated plurality of distance values, each distance value in the sum of distance values corresponding to a hypothesis symbol among the combination of hypothesis symbols,
  determining a lowest combined distance value of the plurality of combined distance values, and
  determining the combination of hypothesis symbols corresponding to the lowest combined distance value as detected symbols of the plurality of spatial streams.

19. A non-transitory computer-readable medium storing instructions that, when executed by at least one processor, cause the processor to:
  select a spatial stream among a plurality of spatial streams, the plurality of spatial streams being included in a received signal vector, the received signal vector being associated with a symbol constellation;
  calculate a plurality of distance values, each distance value representing a distance between the selected spatial stream and a different hypothesis symbol among a plurality of hypothesis symbols, the plurality of hypothesis symbols corresponding to the symbol constellation;
  repeat the selection and the calculation for all spatial streams among the plurality of spatial streams not previously selected; and
  determine a detected symbol of each spatial stream among the plurality of spatial streams based on the plurality of distance values calculated for the plurality of spatial streams.

20. A method performed by a wireless communication device, the method comprising:
  selecting a spatial stream among a plurality of spatial streams, the plurality of spatial streams being included in a received signal vector, the received signal vector being associated with a symbol constellation;
  calculating a plurality of distance values, each distance value representing a distance between the selected spatial stream and a different hypothesis symbol among a plurality of hypothesis symbols, the plurality of hypothesis symbols corresponding to the symbol constellation;
  repeating the selecting and the calculating for all spatial streams among the plurality of spatial streams not previously selected; and
  determining a detected symbol of each spatial stream among the plurality of spatial streams based on the plurality of distance values calculated for the plurality of spatial streams.

* * * * *